United States Patent Office 2,695,011
Patented Nov. 23, 1954

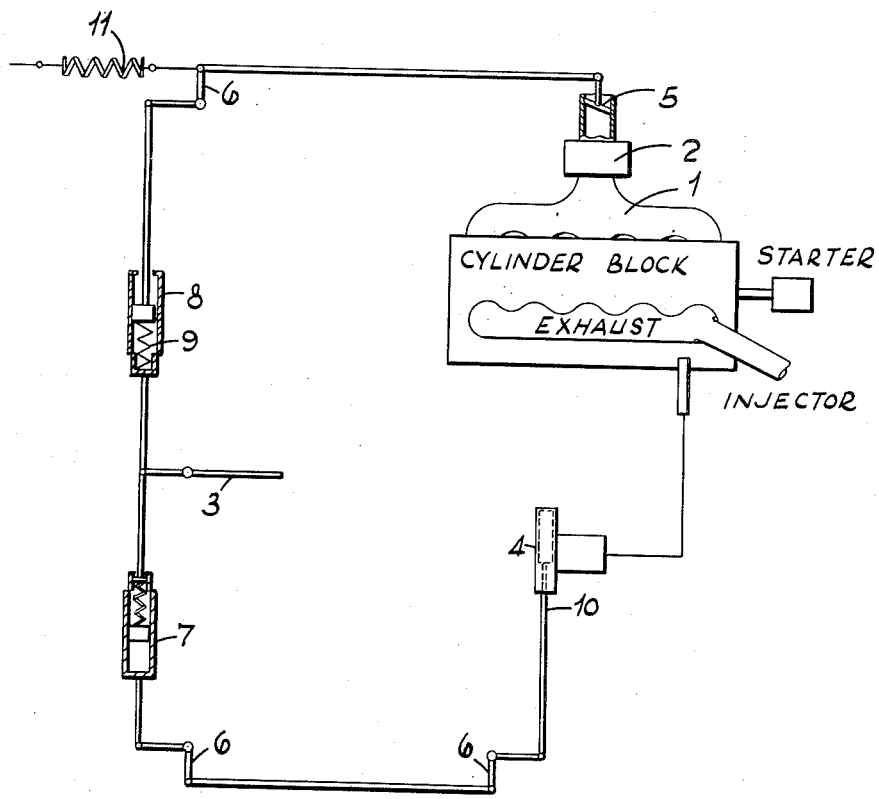

2,695,011

METHOD OF OPERATING COMPRESSION IGNITION ENGINES

Edwin M. Dodds, Belmont, Wantage, and Leonard D. Derry, Botley, England, assignors to Standard Oil Development Company, a corporation of Delaware Application November 10, 1950, Serial No. 194,954

Claims priority, application Great Britain November 22, 1949

1 Claim. (Cl. 123—1)

The present invention relates to compression-ignition engines commonly known as diesel engines. Such engines are extensively used as power units, both as stationary units and as the power unit in automotive vehicles and ships. As is well known they operate on a two-stroke or a four-stroke cycle analogous to that of a spark-ignition gasoline engine, but instead of drawing in a combustible air-fuel mixture on the induction stroke, air only is drawn in and compressed to a high temperature in the compression stroke. Liquid fuel is then injected into the hot compressed air, and burns to give the power stroke.

It will be manifest that the primary function of any engine is the production of power and that this power should be produced as efficiently as possible. The power output of stationary diesels may be used directly in operating pumps or other mechanical devices, or, after conversion to a more conveniently transmittable form such as electric power, may be sold as such. The power to weight ratio of automotive diesels bears directly on its efficiency in moving the vehicle. The point, accordingly, does not need labouring that for a given diesel engine, the higher the maximum practicable power output the better.

In practice, it is found that, as the power output of a diesel engine approaches its practicable maximum, exhaust smoking increases rapidly. The occurrence of exhaust smoking is indicative of poor combustion which can be associated with increased specific fuel consumptions and may result in increased engine fouling and, therefore, maintenance. The occurrence of smoking is particularly troublesome in the case of road vehicles, due to the regulations which prohibit the use on the roads of excessively smoking vehicles, but is highly undesirable in all cases for the previously given reasons.

In this connection it should be noted that diesel engines, in general, use only about 65% of the air available for combustion as compared with nearly 100% in the case of gasoline engines. Attempts to increase the air consumption by the injection of more fuel result in the excessive exhaust smoking previously referred to, presumably due to the relatively short time available for mixing the fuel and air prior to combustion. Besides causing exhaust smoking, it will be clear that such excessive fuel injection wastes fuel.

Exhaust smoking is affected by a number of fuel properties, in particular volatility, viscosity and cetane number. However, on comparing the behaviour of different engines it is found that their exhaust smoking varies in different ways with these fuel properties so that any modification therein leading to a reduction in exhaust smoking for one engine may lead to an increase for another. In addition such variation of fuel properties may have other undesirable effects, such as reduction in cold starting performance.

The purpose of the present invention is to provide a modified combustion process in the combustion chamber of a diesel engine, so that exhaust smoking is reduced, or, alternatively, so that the power output from the engine is increased without increased smoking.

It has been found, according to the present invention, that if additional substantially vaporized fuel is mixed with the inlet air and fed into the combustion chamber of a diesel engine, and if the proportion of such additional fuel in the inlet mixture is insufficient to burn under the conditions of pressure and temperature pertaining in the combustion chamber prior to the injection of the main diesel fuel, then at a suitable setting of the main diesel fuel supply, there is an increase in the power available and that this increase is unaccompanied by an increase in the exhaust smoke density. Alternatively, a setting of the main diesel fuel may be found so that the same power is obtained as when the engine operates according to the prior art, but where there is a reduction in the exhaust smoke density. A feature of a successful application of this invention, for reasons hereinafter described, is that the conventional diesel fuel is used in an amount exceeding 50% of the total fuel intake to the engine. Under these conditions the increase in power output, reduction in exhaust smoke density, or combination of the two, is affected without adversely affecting any other characteristics of engine performance.

The amount of secondary fuel that may be induced with the inlet air before it is present in proportions sufficient to burn prematurely in the combustion chamber, varies with engine design and so the efficiency of this invention will vary with different engines. However, the suitability of an engine for operating under this invention may readily be determined by aspirating a volatilized fuel/air mixture weaker than 1:60 into the air intake of the engine while it is operating under normal diesel conditions. This may easily be performed with the accuracy required, by holding a rag soaked in gasoline about three inches from the intake manifold. If this procedure leads to audible detonation in the engine, then the invention may not be particularly advantageous when applied to that particular engine. However, if detonation is not heard, then the engine is suitable.

Both for simplicity of operation and for best results, it is preferred to introduce into the manifold a volatile hydrocarbon fuel such as gasoline, although substantially vaporized fuels, such as normally gaseous fuels or fuels boiling in the kerosine or diesel fuel range, are also effective. In the case of the higher boiling fuels it is normally necessary to warm the charge, and the resulting decrease in volumetric efficiency of the engine reduces the advantages accruing from the use of the invention.

The invention is particularly advantageously applied by admitting the essentially vaporized secondary fuel to the engine only when the power demands from the engine exceed a chosen percentage of maximum power. The reason for this is apparent when it is considered that most diesel engines are designed so that the maximum available power corresponds to the production of maximum permissable exhaust smoke. Therefore, application of this invention from this point, while giving less increase in smoke for a given increase in power compared to the same power increase obtained by increasing the flow of normal diesel fuel, does nevertheless generally give an increase over the desirable smoking limit. However, if the invention is applied to obtain power in excess of 70%, say, of the maximum power available under conventional operation, then, in general, the remaining 30% of the design power may be obtained at a lower level of exhaust smoking than in the conventional case. There is a limit, however, to the extent to which the conventional diesel fuel injection can profitably be reduced as there comes a point where the gasoline required to augment the diesel fuel to obtain maximum power is enough to enable it to form an explosive mixture in the combustion chamber before the diesel fuel is injected. This is an undesirable condition as "detonation" is encountered. The detonation is clearly audible and readily avoided. The minimum amount of diesel fuel that is required in order that maximum power output may be obtained with the addition of an amount of secondary fuel insufficient to cause detonation, varies with different engine design. It has been found that the diesel fuel injected is always in excess of 50% of the total fuel intake of the engine if detonation or rough running is to be avoided.

The effect dealt with in this invention is highly unexpected, since if the gasoline is added directly to the diesel fuel and injected into the cylinder, it is found that the exhaust smoke density increases. Equally, if additional diesel fuel is atomized into the air intake, the engine behaves substantially as if the extra fuel had been added through the normal injectors. When, however, the extra fuel is added as vapour mixed with the inlet air, marked improvements are observed as will be more apparent from the following description.

Tests were carried out in a 7.7 litre, 6 cylinder A. E. C. direct injection engine in which extra fuel was introduced into the air inlet manifold by means of an auxiliary nozzle, and data obtained of alternations in power, fuel consumption and exhaust smoking. The fuel was supplied to the nozzle by an electrically driven gear pump, provision being made for measuring the fuel consumption.

Preliminary tests were carried out to assess the effect of fuel volatility in the engine. Two tests using different fuels were carried out at 1800 R. P. M., with the maximum fuel stop at the maker's setting, and the maximum power and exhaust smoke density were measured. The fuels used in the two runs were: A—Conventional diesel fuel (A. P. I. gravity 36.8°, cetane No. 55.5, distillation range 184–373° C.); B—Blend of 75% fuel A and 25% pool gasoline (A. P. I. gravity 41.5°, cetane No. 48, distillation range 55–362° C.). The results are set out in tabular form below. In the examples given an exhaust smoke density of 0.15 is regarded as acceptable, and the "100% of reference" maximum power is the engine maker's rating.

Table 1

| Fuel | Exhaust Smoke Density | Maximum Power, Percent of Reference | Specific Heat Input,[1] Percent of Reference |
|---|---|---|---|
| A | 0.15 | 100 | 100 |
| B | 0.25 | 100 | 102.8 |
| B | 0.15 | 92.5 | 102 |

[1] B. th. u./B. H. P. hour.

From these figures it will be apparent that the power output, for a given exhaust smoke density, decreases with increasing volatility of the fuel, and that, under conditions of equal load, exhaust smoking increases with fuel volatility. Furthermore, it was found that considerable speed fluctuations occurred when running with fuel B and, after prolonged running, the exhaust smoke density began to increase still further due to fouling of the injectors. From these results it may fairly be inferred that diesel fuel/gasoline blends are not suitable either for increasing the power output of diesel engines or for reducing the exhaust smoke density.

A second series of tests was then run in which the engine was run on fuel A to 90% of the maker's rated load. The diesel fuel flow was maintained constant and pool gasoline was introduced progressively into the air inlet manifold, increases of power and exhaust smoke density being observed. The test was then repeated at 75% of the rated load, again introducing gasoline into the air inlet manifold.

The results of these tests, both at equal power output and equal exhaust smoke density to the reference run (diesel fuel only), are given in Table 2 below:

Table 2

| Operating Conditions | Exhaust Smoke Density | Maximum Power, Percent of Reference | Specific Heat Input Percent of Reference |
|---|---|---|---|
| Diesel fuel only | 0.15 | 100 | 100 |
| 90% Rated load on diesel fuel and gasoline aspiration | 0.11 | 100 | 98.5 |
|  | 0.15 | 107.5 | 98.5 |
| 75% Rated load on diesel fuel and gasoline aspiration | 0.05 | 100 | 96.3 |
|  | 0.15 | 120.5 | 96.9 |

It should be noted that "knock" was becoming apparent at the power outputs greater than 120.5% of reference in the final run. Nevertheless the improvement in power output is most marked and highly unexpected in view of the previous set of tests.

There is some improvements in total fuel consumption when operating with gasoline injection. As the gasoline is of lower calorific value than the diesel fuel on a volumetric basis, the specific fuel consumption is markedly less, as can be seen from the table. It should also be observed that the cooling effect of the vaporization of the gasoline on the intake air results in a higher volumetric efficiency, and that this effect, while small, serves still further to enhance the benefits derived from the process of the invention.

Further tests were then run in which a burning oil (A. P. I. gravity 42.7°, cetane No. 54.5, distillation range 161–295° C.) was introduced into the air intake in place of the gasoline, the conditions of test being those previously specified. No increase or decrease of exhaust smoke density was observed when introducing the kerosine from either the 75% or 90% rated load points. The total fuel flow to the engine for a given power output was somewhat greater than when operating on diesel fuel alone, as contrasted to the diminished fuel flow with gasoline. In both runs with kerosine injection the engine seized at about the maker's maximum rated power although there was no knocking or excess noise. It is a reasonable assumption that the atomized kerosine, not vaporizing as did the gasoline, removed the oil film from the cylinder liners causing a high piston temperature with consequent seizure. Similar tests carried out with the introduction of diesel fuel A into the air intake gave similar results, but without engine seizure.

In a further set of tests diesel fuel A was vaporized and passed in with the air intake. This was achieved by passing part of the inlet air over the exhaust manifold and injecting the additional fuel into this stream of air prior to passing over the hot exhaust manifold. Operating in this way once again there was a marked increase in power (108% of reference) for an exhaust smoke density of 0.15. It should also be noted that the preheating of the intake air decreases the volumetric efficiency of the engine, and it was estimated that under the conditions of the test this was equivalent to a 2% loss in power.

The previous tests were all carried out at 1800 R. P. M., which is the normal maximum speed of the engine. A further series of tests was carried out at different engine speeds, to assess the exhaust smoke density at the rated load, and the maximum power at 0.15 exhaust smoke density with and without the introduction of gasoline. The results are given in Table 3:

Table 3

| Engine Speed, R. P. M. | Exhaust Smoke Density at rated load | | Maximum power at 0.15 E. S. D. with gasoline aspiration, percent of reference |
|---|---|---|---|
|  | Diesel fuel only | Gasoline aspiration |  |
| 600 | 0.15 | 0.06 | [1] 98.6 |
| 1,000 | 0.15 | 0.06 | [1] 105.4 |
| 1,400 | 0.15 | 0.05 | [1] 108.5 |
| 1,800 | 0.15 | 0.05 | 120.5 |
| 2,000 | 0.15 | 0.08 | 129.9 |

[1] At speeds up to 1,400 R. P. M., the maximum power with gasoline aspiration was limited by "knocking" before 0.15 exhaust smoke density was reached.

Apart from the knocking at excessively high rates of gasoline aspiration, there is no observable increase of noise when operating the engine by the method of the present invention. It is further noteworthy that under comparable test conditions the exhaust temperature is reduced, with consequent beneficial results.

When operating at standard load to reduce smoke density, the octane number of the aspirated fuel seems to be of little significance, the observed smoke densities at 1,800 R. P. M. and full load being substantially the same with n-heptane, 71 O. N., gasoline and iso-octane. The octane number does affect the maximum power obtainable at standard exhaust smoke density of 0.15, however, those obtained when aspirating the same three fuels at 1,800 R. P. M., being 115.5%, 120.5% and 125% of reference respectively.

From the results of these tests, there may be drawn several conclusions on which the process of the present invention is based. Firstly, it is clear that, particularly when operating at loads approaching the maximum, the performance of the engine is improved by employing a blend of combustible vapour and air, in place of the pure air which normally constitutes the air intake. Secondly, this blend should not of itself constitute an inflammable mixture, as to avoid pre-ignition on the compression stroke. As a corollary of this the vaporized fuel thus fed to the engine should always constitute a minor proportion of the total fuel feed.

Since the purpose of the invention is primarily to increase the maximum power output conveniently obtainable from a given engine, or to reduce smoking at a given load, there are two other features which it is preferred to incorporate. Firstly, it is preferred to use normally liquid hydrocarbon fuels such as gasoline to form the air/vapour blend as contrasted with materials such as ethers which are sometimes injected into diesel engines to assist starting, or gaseous materials such as natural gas which are sometimes used as a major fuel in association with supplementary injection of liquid fuel. Secondly, since the advantages of the invention are most pronounced when the engine is running under conditions approaching maximum power, it is preferable that the auxiliary fuel injection of the present invention should be employed only when the engine is delivering at least 50% and preferably at least 75% of its rated maximum power.

Thus, in a practical embodiment of the engine, based for the purposes of illustration on the tests previously described, the diesel fuel supply means would be controlled to deliver a maximum flow corresponding to a power output between say 75% and 90% of the rated maximum output. Up to this point, no gasoline would be aspirated into the engine, but for power outputs above this arbitrarily chosen maximum, gasoline vapor in a suitably controlled amount would be fed in with the air intake.

Also included in the scope of the invention, is apparatus suitable for its practical application. One type of apparatus suitable for carrying out this invention is illustrated in the accompanying drawing. Broadly this represents a diesel engine of conventional type, modified by the provision of means for feeding into the air intake 1 controlled amounts of vaporized combustible fuel in amounts such that the vaporized fuel/air blend does not form an inflammable mixture, due to excess of air.

When using volatile fuel such as gasoline, these means may be in the form of a simple carburettor 2 or an atomizing nozzle, as already described, through which the gasoline is delivered. The carburettor would preferably be of the simple single jet type without slow running arrangements, as this type gives steadily increasing richness of mixture with speed. Such a carburettor would compensate for the knock-limited quantities of gasoline at the lower speeds, as shown in Table 3, and yet provide the full quantity of gasoline needed at full speed. With heavier fuels such as diesel fuel, a vaporizer is needed and this may either make use of existing hot spots on the engine, e. g., the exhaust, or may be independently heated, e. g., electrically. Comparing these two systems, the use of gasoline has the advantage of simplicity and higher maximum power output with avoidance of the relating undesirable vaporizer, while the use of diesel fuel avoids the necessity for a dual-fuel system and the added risk due to the use of a low flash-point fuel.

A convenient device for independently controlling the deliveries of primary (main diesel) and auxiliary (vaporized) fuel involves the use of two lost motion devices associated with the normal governor lever 3. One of these devices links the governor lever 3 with the primary fuel pump rack 4, and the other links the governor lever with the control device, e. g., carburettor butterfly valve 5 or pump delivery control lever. Normal movement of the governor lever tends to open up both fuel delivery systems, the actuating motion, however, being thrust for one and pull for the other, with or without intermediary transmission devices such as bell-crank levers 6. Then, assuming for descriptive purposes, the primary fuel pump to be controlled by pull from the governor lever, while the auxiliary fuel supply is controlled by thrust, when the engine is stopped, both fuel delivery devices are at zero, and both lost motion devices are slack. When the engine is started and as its power output increases, the governor lever moves over opening the primary fuel pump 4 without taking up the slack on the primary lost motion device 7, but at the same time taking up the slack on the secondary lost motion device 8, whose free movement under the thrust exerted on it is resisted by spring means 9 which tend to keep the secondary fuel supply means normally at zero position. As the engine speed increases, the primary fuel pump rack 4 comes to bear against a stop or abutment 10 corresponding to the predetermined maximum power output for primary fuel only (e. g. 90% of the normal maximum rating as previously discussed). At this point the primary fuel pump control is incapable of further movement, the primary lost motion device is still slack, but all the slack has been taken up in the secondary lost motion device. Accordingly further movement of the governor lever in the sense of increasing power output causes no additional movement of the primary fuel pump control, the governor lever movement being taken up in the primary lost motion device. All slack having been taken up, however, in the secondary lost motion device, this additional governor lever movement now exerts its thrust against the zero spring 11 of the secondary fuel supply control and progressively opens the secondary fuel supply.

The lost motion devices may conveniently be in the form of spring-loaded plungers having limited motion within complementary cylinders, but other conventional types may also be used. The relative strengths of the springs should, of course, be such that the secondary lost motion device 8 is compressed in preference to the extension of the zero spring 11 of the secondary fuel supply control, and that movement of the primary fuel pump rack 4 occurs in preference to compression of the primary lost-motion device 7.

In the preferred practical embodiment of the apparatus of the invention, the governor lever actuates the primary fuel pump control by tension through a spring-loaded plunger type lost motion device, the secondary fuel supply being in the form of a gasoline carburettor whose butterfly valve is opened by the thrust of the governor lever acting through the secondary lost motion device and a bell-crank lever, this thrust being opposed by a tension spring also acting on the bell-crank lever.

It will be obvious that many other mechanical devices may be used for the independent control of the diesel fuel supply means and the aspirated fuel supply means. For example, a pair of staggered cams operated from the accelerator pedal may be so disposed that diesel fuel only is fed up to the predetermined maximum load, in response to rotation of the first cam, following which the diesel fuel supply remains constant with further rotation of the first cam, and the second cam, coming into operation, controls the flow of aspirated fuel.

To recapitulate, the present invention provides a method of and apparatus for operating a compression-ignition engine so as to obtain a high power output at a given exhaust smoke density. In brief this method consists of employing as the "air intake," a non-explosive mixture of air and combustible fuel vapour. Preferably, this mixture is employed only when the engine is nearing its maximum rated power output, the main fuel supply then being controlled at a point below its normal maximum. Thus the invention may be regarded as an improved method of operating a diesel engine, or as an improved method of converting liquid fuels to power and waste gases through the intermediary of a diesel engine.

Hence the invention also provides a method for producing hot propulsive gases under pressure, of the type obtained in the combustion chamber of a diesel engine in which fuel is sprayed into air that has been compressed, wherein the air is replaced by a mixture of air and an essentially vaporized secondary fuel the secondary fuel being present in an amount insufficient to burn under the conditions of temperature and pressure pertaining in the combustion chamber up to the time that the conventional fluid is injected and in which less secondary than conventional fuel is burnt.

In its broad aspect, the apparatus of the invention comprises a diesel engine provided with means adapted to deliver a non-explosive mixture of air and fuel vapour as the "air intake," the narrower and preferred aspects providing carburettor or vaporizer systems for the auxiliary fuel, associated with control means adapted to supply the auxiliary fuel vapour only when the engine is delivering a major proportion, preferably over 75% but under 100%, of its maximum rated power.

What we claim is:
The method of operating a diesel engine under loads greater than about 50% of its rated maximum power to improve combustion and minimize smoking which comprises: aspirating a mixture of gasoline vapors and air into the engine during the normal air intake stroke of the engine in a ratio of gasoline to air of less than 1:60 whereby the gasoline and air mixture is non-inflammable so that the compression of the mixture occurs without detonation during the compression stroke of the engine, and thereafter injecting diesel fuel into the compressed mixture in the engine at the normal fuel injection period of the engine cycle, the amount of diesel fuel injected into the engine exceeding the amount of gasoline aspirated into the engine by more than 50%.

References Cited in the file of this patent

UNITED STATES PATENTS

| Number | Name | Date |
|---|---|---|
| 673,160 | Diesel | Apr. 30, 1901 |
| 1,128,463 | Lake | Feb. 1, 1915 |
| 1,858,824 | Heidelberg | May 17, 1932 |
| 2,534,346 | Fenney | Dec. 19, 1950 |